Figures 1, 2, 3:
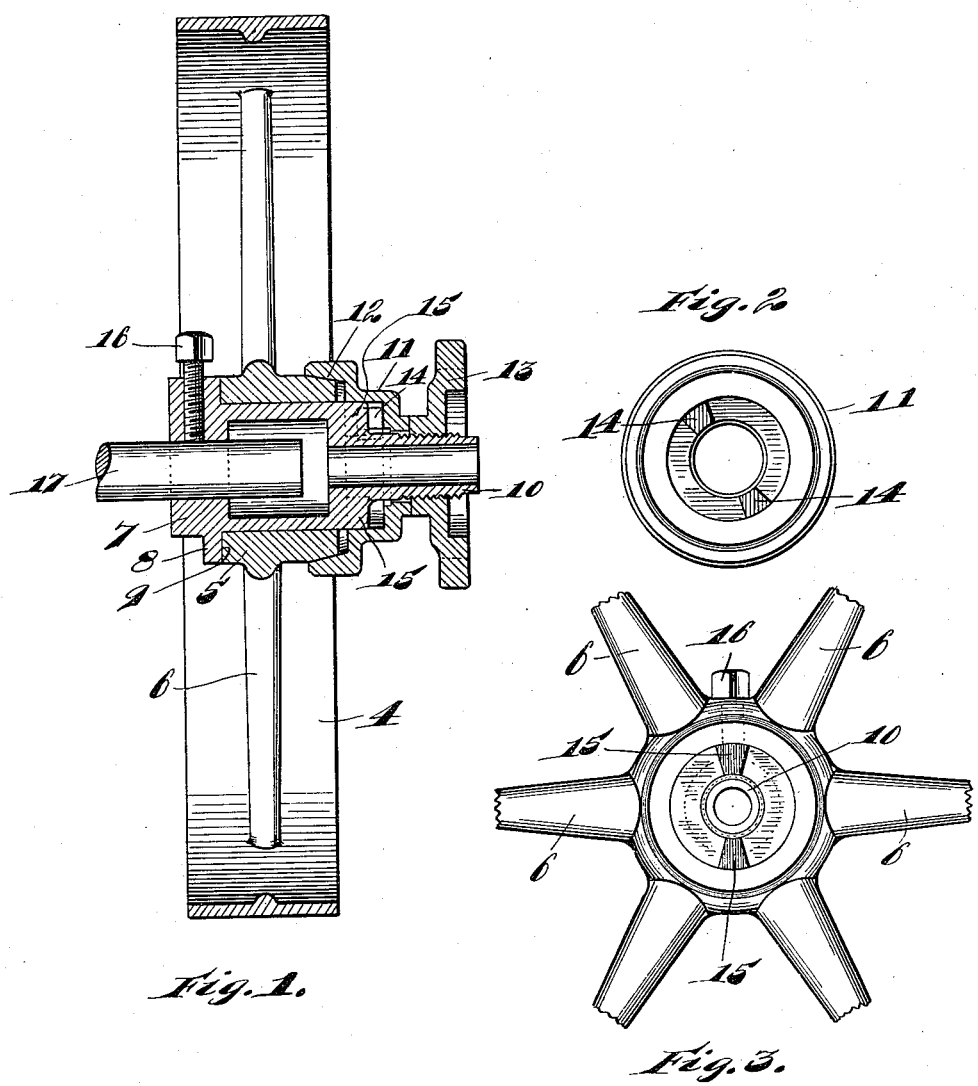

A. MASTER.
FRICTION CLUTCH.
APPLICATION FILED SEPT. 16, 1914.

1,157,408.

Patented Oct. 19, 1915.

Witnesses:
C. E. Wessels.
B. Y. Richards

Inventor:
Albert Master,
By Joshua R. H. Potts
his Attorney.

UNITED STATES PATENT OFFICE.

ALBERT MASTER, OF PARK RIDGE, ILLINOIS.

FRICTION-CLUTCH.

1,157,408.  Specification of Letters Patent.  Patented Oct. 19, 1915.

Application filed September 16, 1914. Serial No. 861,976.

*To all whom it may concern:*

Be it known that I, ALBERT MASTER, a citizen of the United States, and a resident of the city of Park Ridge, county of Cook, and State of Illinois, have invented certain new and useful Improvements in Friction-Clutches, of which the following is a specification.

My invention relates to improvements in friction clutches and has for its object the provision of an improved construction of this character which is of simple construction and efficient in operation.

The invention consists in the combinations and arrangements of parts hereinafter described and claimed.

The invention will be best understood by reference to the accompanying drawing forming a part of this specification, and in which, Figure 1 is a sectional view of a friction clutch embodying my invention, Fig. 2, an interior face view of a friction clutch member employed in the construction, and Fig. 3, a face view of the coöperating parts of the clutch.

The preferred form of construction as illustrated in the drawing comprises an ordinary driving pulley 4 having a central hub 5 supported therein by means of spokes 6. A head 7 is extended through hub 5 and is provided on one side with a radially extending flange 8 contacting with the corresponding side of said hub, the contacting surfaces 9 of said flange and said hub being finished for frictional engagement. At its other end head 7 is provided with a reduced threaded extension 10 protruding from the corresponding side of said hub and a friction clutch member 11 is loosely mounted on said extension. Clutch member 11 is substantially in the form of a stepped cup and is provided with an internal conical friction surface 12 coöperating with a corresponding surface on hub 5 as indicated in Fig. 1. A hand wheel 13 is threaded on extension 10 to bear against the outer side of clutch member 11 and serve as a means for forcing said clutch member into frictional engagement with hub 5. Clutch member 11 is provided with lugs 14 arranged to interlock by slidably engaging with corresponding lugs 15 formed on the corresponding face of head 7 to positively connect said clutch member to said head against relative rotation. Head 7 is provided with a set screw 16 by means of which it may be secured to the end of a driven shaft 17 as indicated in Fig. 1. By this arrangement it will be observed that the frictional engaging surfaces may be gradually drawn into engagement with each other and thus shaft 17 started gradually.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A friction clutch comprising a pulley provided with a hub; a head extending through said hub and provided with a threaded extension; a clutch member loose on said extension and arranged to frictionally engage said pulley; a binding member threaded on said extension and arranged to force said clutch member into engagement with said hub; and interlocking lugs on the outer face of said head and on the inner face of said clutch member, substantially as described.

2. A friction clutch comprising a pulley provided with a hub having an external conical friction surface adjacent its outer end; a head extending through said hub and provided with a threaded extension; a clutch member loose on said extension and provided with an internal conical frictional surface arranged to frictionally engage the friction surface on said hub; a binding member threaded on said extension and arranged to force said clutch member into engagement with said hub; and interlocking lugs on the outer face of said head and on the inner face of said clutch member, substantially as described.

In testimony whereof I have signed my name to this specification in the presence of two subscribing witnesses.

ALBERT MASTER.

Witnesses:
JOSHUA R. H. POTTS,
B. G. RICHARDS.